United States Patent
Engel et al.

(10) Patent No.: US 10,579,964 B1
(45) Date of Patent: Mar. 3, 2020

(54) METHOD, APPARATUS AND SYSTEM FOR GOODS REPLENISHMENT

(71) Applicant: Intelligrated Headquarters, LLC, Mason, OH (US)

(72) Inventors: Christopher M. Engel, Mason, OH (US); Eric Spitzley, Loveland, OH (US); Mark David Steinkamp, Mason, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 3 days.

(21) Appl. No.: 16/107,048

(22) Filed: Aug. 21, 2018

(51) Int. Cl.
*G06Q 10/08* (2012.01)
*G06K 17/00* (2006.01)
*G06Q 10/06* (2012.01)

(52) U.S. Cl.
CPC ........... *G06Q 10/087* (2013.01); *G06Q 10/08* (2013.01); *G06K 2017/0048* (2013.01); *G06K 2017/0051* (2013.01); *G06Q 10/06* (2013.01)

(58) Field of Classification Search
None
See application file for complete search history.

(56) References Cited

U.S. PATENT DOCUMENTS

| 6,061,607 | A | 5/2000 | Bradley et al. |
| 9,611,097 | B2 | 4/2017 | Lert |
| 2007/0005180 | A1* | 1/2007 | Stingel, III .......... B65G 1/0464 700/213 |
| 2018/0015093 | A1* | 1/2018 | Stern .................... C07D 401/12 |

OTHER PUBLICATIONS

Unknown Author, "Supply Chain Logistics and Warehouse Management—Understanding the Supply Chain Logistics Segment (part 2)", United States Information Source, retrieved from <http://www.12345w.xyz/info-source-us/asclmwm-2b.html> on Sep. 20, 2017, 23 pages.

* cited by examiner

*Primary Examiner* — Kristy A Haupt
(74) *Attorney, Agent, or Firm* — Alston & Bird LLP

(57) ABSTRACT

The present disclosure relates to a method for replenishing containers with goods from stock keeping units (SKUs) arriving at a replenishment area in a distribution center. A central controller receives a first set of data comprising a plurality of first predefined threshold values, each indicative of a maximum capacity of goods in a corresponding SKU. The central controller associates the first set of data to a second set of data comprising one or more container identifiers having a second predefined threshold value indicative of a capacity of a corresponding container. Further, the central controller generates an ordered sequence of container identifiers indicative of the containers to be retrieved to the replenishment area for receiving goods from the plurality of SKUs based on the association of the first set of data with the second set of data.

20 Claims, 6 Drawing Sheets

METHOD, APPARATUS AND SYSTEM FOR GOODS REPLENISHMENT

TECHNOLOGICAL FIELD

Example embodiments of the present invention relate generally to material handling method, apparatus, and system, and more particularly, to method and system for replenishing goods in a distribution center.

BACKGROUND

Applicant has identified several technical challenges associated with replenishing containers with goods and other associated systems and methods. Through applied effort, ingenuity, and innovation, many of these identified challenges have been overcome by developing solutions that are included in embodiments of the present invention, many examples of which are described in detail herein.

SUMMARY

The following presents a simplified summary to provide a basic understanding of some aspects of the disclosed goods replenishment method and system. This summary is not an extensive overview and is intended to neither identify key or critical elements nor delineate the scope of such elements. Its purpose is to present some concepts of the described features in a simplified form as a prelude to the more detailed description that is presented later.

The illustrative embodiments of the present disclosure relate to systems and methods for replenishing goods into containers in a material handling environment. According to at least one aspect of the present disclosure, a method for replenishing containers with goods from stock keeping units (SKUs) arriving at a replenishment area in a distribution center is provided. The method includes receiving, by a central controller, a first set of data associated with a plurality of SKUs arriving at the replenishment area. The first set of data may include a plurality of first predefined threshold values, each indicative of a maximum capacity of goods in a corresponding SKU. The method further includes associating, by the central controller, the first set of data to a second set of data. The second set of data may include one or more container identifiers with each container identifier having a second predefined threshold value. Each second predefined threshold value is indicative of a capacity of a corresponding container. Further, the first set of data may be associated with the second set of data by correlating the first predefined threshold values to the second predefined threshold values. The method further includes generating, by the central controller, an ordered sequence of container identifiers based on the association of the first set of data with the second set of data. The ordered sequence of container identifiers is indicative of the containers to be retrieved to the replenishment area for receiving goods from the plurality of SKUs.

According to one or more embodiments of the present disclosure, the first set of data may be obtained by scanning a pallet identifier of a pallet having the plurality of SKUs.

According to one or more embodiments of the present disclosure, the first set of data may be obtained by scanning one or more SKU identifiers associated with each of the plurality of SKUs.

According to one or more embodiments of the present disclosure, generating the ordered sequence of containers may include determining, by the central controller, a first predefined threshold value for a first SKU; identifying, by the central controller, one or more containers such that a sum of the second predefined threshold values of the one or more containers may be more than or equal to the first predefined threshold value of the first SKU; and determining, by the central controller, container identifiers associated with each of the one or more containers as a segment of the ordered sequence of containers. Further, the method steps described above may be repeated for each of the plurality of SKUs to determine the ordered sequence of containers for the plurality of SKUs.

According to one or more embodiments of the present disclosure, generating the ordered sequence of container identifiers may further include generating a first ordered sequence of container identifiers indicative of a first set of containers to be retrieved to a first replenishment zone of the replenishment area for receiving goods from the plurality of SKUs, and generating a second ordered sequence of container identifiers indicative of a second set of containers to be retrieved to a second replenishment zone of the replenishment area for receiving goods from the first set of containers.

According to one or more embodiments of the present disclosure, the second predefined threshold value may be indicative of a maximum capacity of a corresponding container.

According to one or more embodiments of the present disclosure, the second predefined threshold value may be indicative of a current capacity of a corresponding container.

According to one or more embodiments of the present disclosure, the method may further include determining, by the central controller, one or more related SKUs from the plurality of SKUs based on matching at least one characteristic of the plurality of SKUs; and assigning, by the central controller, a same container identifier to the one or more related SKUs based on the second predefined threshold value of the container.

According to one or more embodiments of the present disclosure, the at least two laterally movable arms are actuated to move inwardly towards each other from the second predetermined distance to the first predetermined distance to receive a next container from the infeed conveyor portion.

According to another aspect of the present disclosure, a method for replenishing containers with goods from stock keeping units (SKUs) arriving at a replenishment area in a distribution center is provided. The method includes transmitting, to a central controller, a first set of data associated with a plurality of SKUs arriving at the replenishment area. The first set of data may include a plurality of first predefined threshold values, each indicative of a maximum capacity of goods in a corresponding SKU. The method further includes receiving, from the central controller, an ordered sequence of container identifiers indicative of the containers to be retrieved to the replenishment area for receiving goods from the plurality of SKUs based on an association of the first set of data with a second set of data, the second set of data having one or more container identifiers with each container identifier having a second predefined threshold value indicative of a capacity of a corresponding container. Further, the first set of data may be associated with the second set of data by correlating the first predefined threshold values to the second predefined threshold values. The method may further include retrieving the containers to the replenishment area based on the ordered sequence of container identifiers, and replenishing goods from each of the plurality of SKUs into the containers.

According to one or more embodiments of the present disclosure, the method may further include scanning a pallet identifier of a pallet having the plurality of SKUs to transmit the first set of data associated with the plurality of SKUs.

According to one or more embodiments of the present disclosure, the method may further include scanning one or more SKU identifiers associated with each of the plurality of SKUs to transmit the first set of data associated with the plurality of SKUs.

According to one or more embodiments of the present disclosure, receiving the ordered sequence of container identifiers may include receiving a first ordered sequence of container identifiers indicative of a first set of containers to be retrieved to a first replenishment zone of the replenishment area for receiving goods from the plurality of SKUs; and receiving a second ordered sequence of container identifiers indicative of a second set of containers to be retrieved to a second replenishment zone of the replenishment area for receiving goods from the first set of containers.

According to one or more embodiments of the present disclosure, the second predefined threshold value may be indicative of a maximum capacity of a corresponding container.

According to one or more embodiments of the present disclosure, the second predefined threshold value may be indicative of a current capacity of a corresponding container.

According to one or more embodiments of the present disclosure, replenishing goods from an SKU into one or more containers may include scanning an SKU identifier associated with the SKU and scanning one or more tote identifiers associated with the one or more containers to associate the one or more containers with the goods in the SKU.

According to another aspect of the present disclosure, a system for replenishing containers with goods from stock keeping units (SKUs) arriving at a replenishment area in a distribution center is provided. The system may include a central controller, and one or more devices, communicably coupled to the central controller, for transmitting a first set of data associated with a plurality of SKUs arriving at the replenishment area to the central controller. The first set of data may include a plurality of first predefined threshold values, each indicative of a maximum capacity of goods in a corresponding SKU. The central controller may associate the first set of data to a second set of data having one or more container identifiers with each container identifier having a second predefined threshold value. Each second predefined threshold value may be indicative of a capacity of a corresponding container, and the first set of data may be associated with the second set of data by correlating the first predefined threshold values to the second predefined threshold values. The central controller may further generate an ordered sequence of container identifiers based on the association of the first set of data with the second set of data, the ordered sequence of container identifiers indicative of the containers to be retrieved to the replenishment area for receiving goods from the plurality of SKUs.

According to one or more embodiments of the present disclosure, the one or more containers may be retrieved to the replenishment area based on the ordered sequence of container identifiers.

According to one or more embodiments of the present disclosure, the system may further include a gravity flow rack connecting a first replenishment zone to a second replenishment zone of the replenishment area for transferring containers between the first replenishment zone and a second replenishment zone. Further, the central controller may generate a first ordered sequence of container identifiers, the first ordered sequence of the container identifiers being indicative of a first set of containers to be retrieved to the first replenishment zone of the replenishment area for receiving goods from the plurality of SKUs, and may generate a second ordered sequence of container identifiers, the second ordered sequence of the container identifiers being indicative of a second set of containers to be retrieved to the second replenishment zone of the replenishment area for receiving goods from the first set of containers.

According to one or more embodiments of the present disclosure, after replenishment, the first set of containers may be transferred to the second replenishment zone through the gravity flow rack.

According to one or more embodiments of the present disclosure, after replenishment, the second set of containers may be transferred to a storage location in the distribution center.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
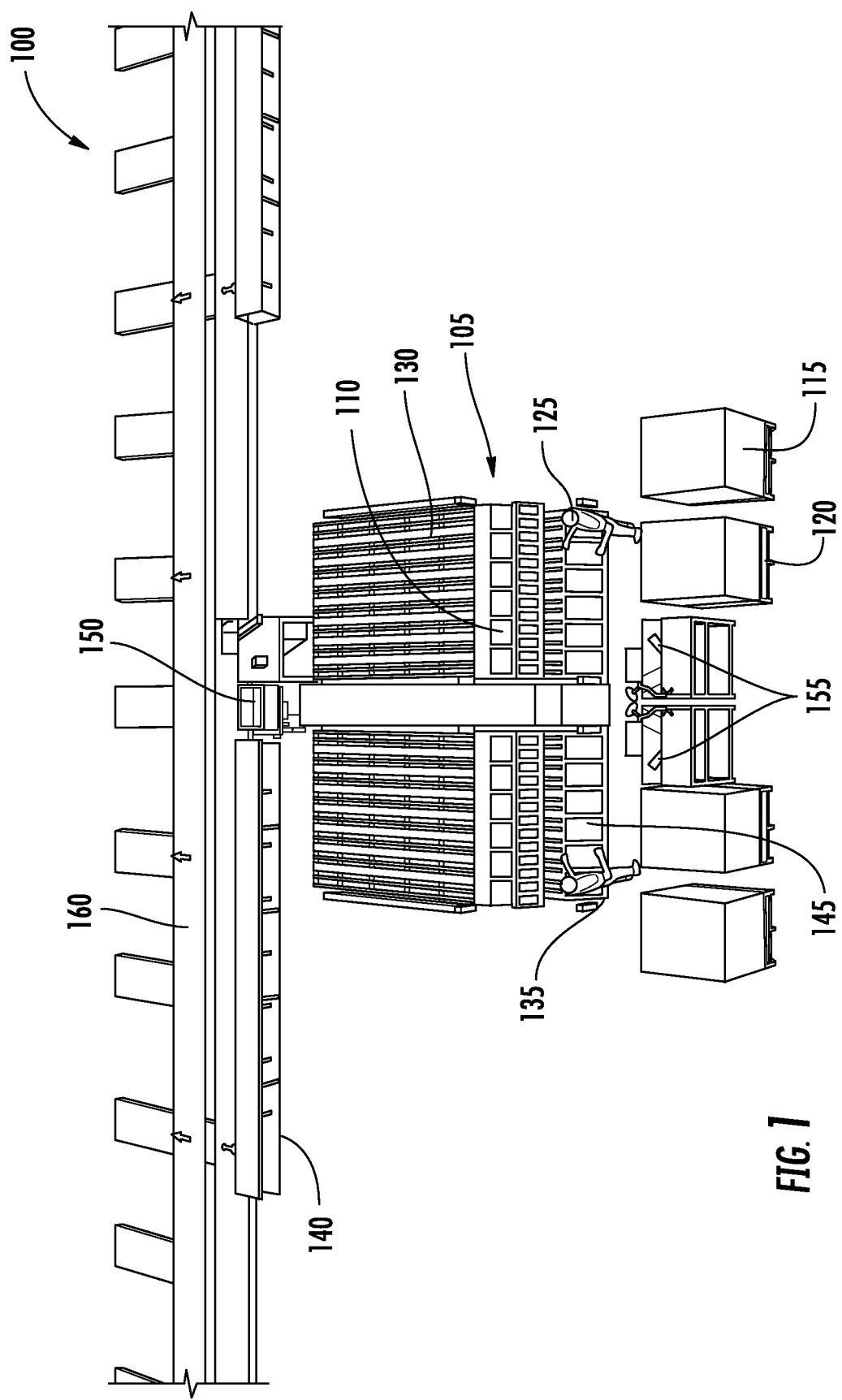
FIG. 1 illustrates a perspective view of a distribution center in accordance with one or more embodiments of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

Goods replenishment and distribution center stocking scheme are essential components of high volume distribution and fulfillment operations. Generally, a distribution center receives multiple stock keeping units (SKUs) of diverse types of products. Goods from multiple SKUs are replenished into containers and stocked within the distribution center with a goal to maximize storage and picking efficiency.

A distribution center may have a regular inflow of SKUs containing goods of different types, sizes, manufacturers, and the like. These goods may need to be replenished into containers (such as totes) for stocking within the distribution center, and/or for further handling, (such as sorting, shipping, etc.) in a material handling environment. Thus, an operator may need to identify an appropriate container based on size, type, etc. of the goods in an SKU for replenishment. This process is generally time consuming and inefficient. Automating the replenishment process can reduce time, manpower, and costs.

The methods and systems for replenishing containers with goods from SKUs arriving at a replenishment area in a distribution center, described herein in accordance with one or more embodiments of the present disclosure, automatically identify the right container(s) for storing goods from each SKU, delivery the identified container(s) to the operator for replenishment, and return the container(s) to storage and/or to further handling stations.

FIG. 1 illustrates a perspective view of a distribution center (DC) 100, in accordance with one or more embodiments of the present disclosure. The DC 100 may receive goods in bulk from various manufacturers, suppliers, stores, shipping stations, and the like, and may store and/or handle received goods until the goods are further picked and/or shipped. The received goods may be transferred into totes and/or containers of appropriate size, shape, material, etc. for storage and/or further processing. In accordance with the present disclosure, the DC 100 may have a replenishment area 105 for replenishing one or more containers 110 with goods arriving at the replenishment area 105 in multiple stock keeping units (SKUs) 115. The term "replenishment area" as used herein may refer to an area, system, workstation, and the like in the DC 100 for transferring goods from the multiple SKUs 115 into one or more containers 110. The replenishment area 105 may have a collaborative system of multiple material handling devices and systems, such as, but not limited to, infeed conveyors, outfeed conveyors, goods to operator workstations, devices, staging units, and the like. Transferring goods from an SKU into the containers 110 may be automated, for example, may be done by a robotic tool, and/or may be a manual process carried out by an operator, such as operator 125, as shown in FIG. 1

Further, an SKU 115 may include goods of a similar type, size, shape, and/or any other common characteristic. Each SKU 115 may have a corresponding SKU identifier (not shown) associated with the SKU 115. SKU identifier is an unique identifier that may be used to identify a particular SKU 115, such as, but not limited to, a barcode label, RFID tag, etc. The SKU identifier is associated with information related the SKU 115, such as, item number, number of goods in the SKU, type of goods, manufacturer or supplier details, SKU size, SKU weight, and the like. In an embodiment of the present disclosure, the SKU identifier is associated with a first predefined threshold value of a SKU 115. The first predefined threshold value may indicate a maximum capacity of goods contained in the SKU 115. For example, the first predefined threshold value may indicate a cubic measure of the goods contained in the SKU 115. In some embodiments, the SKU identifier may be scanned and/or read at the replenishment area 105 to obtain the information coded in the SKU identifier, such as the first predefined threshold value. In some embodiments, information related the SKU 115 is stored in a database and identifiable based on the SKU identifier.

In an embodiment, one or more SKUs 115 may be grouped together and stacked on a pallet 120, as shown in FIG. 1. The SKUs 115 may be grouped based on a common characteristic, such as type of goods. Additionally or alternatively, mixed SKUs 115 may be grouped randomly and placed on the pallet 120. Further, the SKUs 115 may be grouped and stacked on the pallet 120 by the manufacturer and/or the supplier of the SKUs 115, and/or the SKUs 115 may be grouped and stacked on the pallet 120 at the DC 100 for ease of handling. In an embodiment of the present disclosure, each pallet 120 may further include a pallet identifier (not shown). Pallet identifier may refer to a unique identifier that may be used to identify a particular pallet 120, such as, but not limited to, a barcode label, RFID tag, etc. The pallet identifier may include pallet manifest information identifying number of SKUs on the pallet 120, SKU identifiers of SKUs on the pallet 120, type of goods, manufacturer or supplier details, pallet size, pallet weight, and the like. In an embodiment of the present disclosure, the pallet identifier may include first predefined threshold values for each SKU 115 placed on the pallet 120. Thus, the pallet identifier may indicate a maximum capacity of goods contained in each individual SKU 115 placed on the pallet 120. In another embodiment, the pallet identifier may indicate a collective maximum capacity of goods placed on the pallet 120 by determining a sum of first predefined threshold values for each SKU 115 placed on the pallet 120. The pallet identifier may be scanned and/or read at the replenishment area 105 to obtain the information coded in the pallet identifier. In some embodiments, information related the pallet 120 is stored in a database and identifiable based on the pallet identifier. In some embodiments, by scanning pallet identifier at the replenishment area 105, the information related the pallet 120 is updated to indicate that location of the pallet 120 is at the replenishment area 105.

In accordance with the present disclosure, with reference to FIG. 1, the replenishment area 105 further includes a gravity flow rack 130 for staging and/or conveying one or more containers 110. In the disclosed embodiment, the replenishment area 105 may include a first replenishment zone 135 having a first set of containers 145 and a second replenishment zone 140 having a second set of containers 150, as shown in FIG. 1. The two replenishment zones will be described later with reference to FIG. 2 and FIG. 3. The gravity flow rack 130 may be placed between the first replenishment zone 135 and the second replenishment zone 140, such that the gravity flow rack 130 may convey replenished containers 110 from the first replenishment zone 135 to the second replenishment zone 140, and convey empty containers 110 back from the second replenishment zone 140 to the first replenishment zone 135. The gravity flow rack 130 may also function as a staging area for the empty and/or filled containers 110 until the containers 110 are handled by the operator 125 and/or a robotic tool.

The replenishment area 105 may further include one or more devices 155, as shown in FIG. 1. The devices 155 may refer to any portable and/or fixed device communicably coupled to a central controller (not shown) for assisting the operator 125 in the replenishment process. The device 155 may include, but is not limited to, scanners, imagers, displays, computers, communication devices, headsets, and the like. In an embodiment, one or more devices 155 may scan the SKU identifiers and/or the pallet identifiers to obtain a first set of data including the first predefined threshold values for each SKU 115 arriving at the replenishment area 105. The one or more devices 155 may transmit the first set of data to the central controller for further processing. The one or more devices 155 may further receive data, commands, workflows, etc. from the central controller and/or any other device communicably coupled to the one or more devices 155.

Thus, in accordance with an embodiment of the present disclosure, pallets 120 having one or more SKUs 115 may arrive at the replenishment area 105 of the DC 100. The operator 125 may scan the pallet identifier and/or each SKU identifier using the device 155. The device 155 may obtain the first set of data from the pallet identifier and/or SKU identifiers, and may transmit the first set of data to the central controller. The central controller may identify one or more containers 110 for replenishing goods from an SKU 115 and/or the pallet 120 based on the first set of data, as will be described later with reference to FIGS. 2 and 3. The operator 125 or a robotic tool may pick the identified one or more containers 110 from the first set of containers 145 on the gravity flow rack 130 for replenishing the one or more containers 110 with the goods in the SKU 115 and/or the pallet 120. Once replenished, the one or more containers 110 may be placed on the gravity flow rack 130 and may be conveyed from the first replenishment zone 135 to the second replenishment zone 140 through the gravity flow rack 130. Further, an operator or a robotic tool in the second replenishment zone 140 may replenish a second set of containers 150 with goods in the one or more containers 110 on the gravity flow rack 130 received from the first replenishment zone 135. Empty container(s) are placed on the gravity flow rack 130 for transferring back to the first replenishment zone 135 for receiving goods from a next SKU 115 and/or pallet 120.

In some embodiments of the present invention, a controller (such as the central controller described below) determines the best pallet to choose for replenishment. For example, the controller may receive a priority table that indicates the priorities for replenishing the pallets. Based on the priority table, the controller may determine the pallet for replenishment. In some embodiments, the controller may retrieve a special rule based on the particular material handling environment that the replenishment took place.

In an embodiment, the second set of containers 150 may include shuttle totes for storing goods in an Automated Storage and Retrieval System (ASRS) in the DC 100. Once filled, the second set of containers 150 may be pushed onto a take away conveyor 160, as shown in FIG. 1. The take away conveyor 160 may convey the replenished second set of containers 150 to a storage location and/or to downstream material handling systems for further processing and/or handling.

Figure 2:
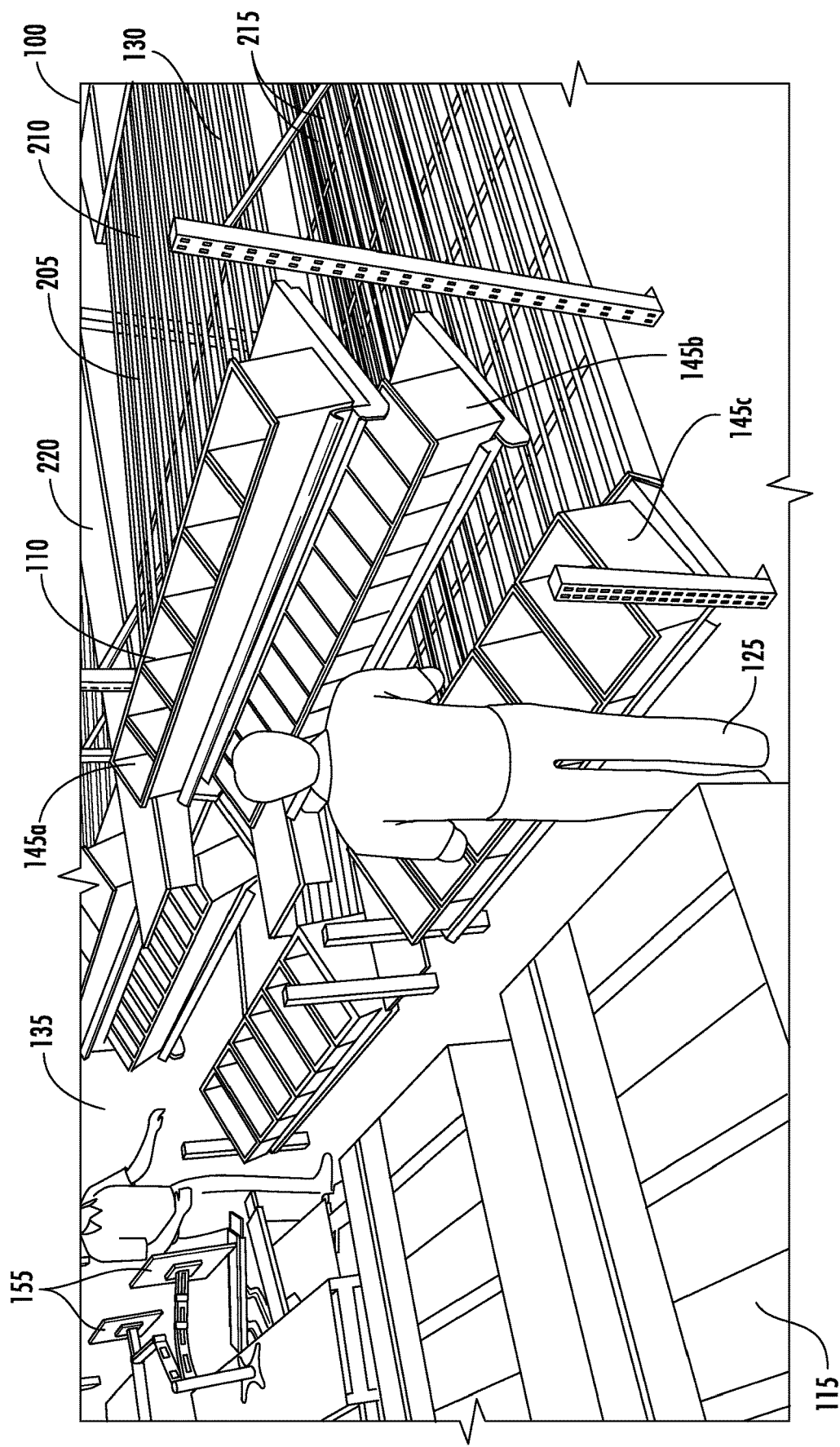
FIG. 2 illustrates a perspective view of a first replenishment zone of the distribution center in accordance with an embodiment of the present disclosure.

FIG. 2 illustrates a perspective view of the first replenishment zone 135 of the distribution center (DC) 100, in accordance with one or more embodiments of the present disclosure. The replenishment process in the first replenishment zone 135 includes replenishing one or more containers 110 from the first set of containers 145 placed on the gravity flow rack 130 with goods from the one or more SKUs 115 arriving at the replenishment area 105. The first set of containers 145 may include containers 110 of different types, size, shape, and the like. In an embodiment, as shown in FIG. 2, the first set of containers 145 includes containers of three different sizes: 145a, 145b, 145c. Containers 145a may be moderate size containers, whereas containers 145b may be smaller than containers 145a, and containers 145c may be larger than containers 145a. Further, each of the containers 110 has an associated container identifier (not shown). As described above, the container identifier may refer to a unique identifier that may be used to identify a particular container of containers 110, such as, but not limited to, a serial number, a barcode label, RFID tag, etc. The container identifier may include information regarding the container 110, such as, but not limited to, type, size, capacity, weight, shape, and the like.

In an embodiment of the present disclosure, each container identifier may include a second predefined threshold value for a corresponding container of containers 110. The second predefined threshold value may indicate a capacity of the container. In an embodiment, the second predefined threshold value may indicate a maximum capacity of the container. For example, the second predefined threshold values for each of the three containers 145a, 145b, and 145c may be x cubic unit, y cubic unit, and z cubic unit, such that $x > y$ and $y < z$. In another embodiment, the second predefined threshold value may indicate a current capacity of the container, for example, when the container is partially occupied. The container identifier for a container may be scanned before each replenishment operation for the container so that the central controller and/or any other device in the DC 100 may track occupied volume of the container 110, and thus, may calculate a current capacity based on the maximum capacity of the container 110 and the occupied volume.

For maximizing the storage capacity and overall efficiency of the DC 100, it is important to pick appropriate sized container(s) 110 from the first set of containers 145 for storing goods from the SKUs 115. For example, an SKU 115 may have x1 cubic unit of goods, as identified by the first predefined threshold value associated with the SKU 115, as described above. For example, x1 cubic unit may equal to the sum of x and y cubic units corresponding to containers 145a and 145b. However, if an operator 125 selects the containers 110 for replenishment based on visual inspection of the goods in an SKU and the containers 145, the operator 125 may not select the most appropriate and optimal container(s) 110 from the first set of containers 145.

Thus, in accordance with the present disclosure, the containers are identified based on the first predefined threshold value and the second predefined threshold value by the central controller. That is, the operator 125 scans a SKU identifier associated with an SKU 115 being handled or a pallet identifier associated with the pallet that SKU 115 is on. In response, the central controller receives a first set of data having a first predefined threshold value of the SKU 115. The first predefined threshold value indicates the maximum capacity of goods in the SKU 115, for example, x1 cubic unit, as described above.

The central controller may then access a database of a second set of data. The second set of data may refer to data associated with the one or more containers 110 in the replenishment area 105. In an embodiment, the second set of data may include container identifiers, such as serial numbers, for each container 110 being used in the replenishment process. The container identifiers may further include the second predefined threshold values for each container 110, indicative of a capacity of the container 110, for example x cubic unit for container 145a. The central controller correlates the first predefined threshold value of the SKU 115 with the second predefined threshold values for the containers 110. Thus, the central controller may determine that the operator 125 may need one of each containers 145a and 145b having x and y cubic unit capacity to accommodate goods from the SKU 115 having x1 cubic unit of goods, wherein x1 equals to the sum of x and y cubic units.

Further, the central controller may generate a first ordered sequence of container identifiers based on the above determination. For example, the central controller may generate an ordered sequence of a serial number of a container 145a followed by a serial number of a container 145b for the SKU 115. The ordered sequence of container identifiers may be transmitted to the replenishment area 105 and may be displayed on a display of device 155, as shown in FIG. 2. The operator 125 may follow the ordered sequence displayed on the display of device 155, and may pick the identified containers 145a and 145b from the gravity flow rack 130 for replenishing with goods from the SKU 115. In an embodiment, the identified containers 145a and 145b may be presented to the operator 125 in the ordered sequence, for example, on a goods-to-operator workstation. In another embodiment, the gravity flow rack 130 may include a pick-to-light system such that pick-to-light system displays an ordered sequence of indicators (such as light) at the locations of the identified containers 145a and 145b corresponding to the first ordered sequence of container identifiers.

Further, the operator 125 or a robotic tool may verify container identifiers associated with each picked container (145a and 145b, for example) by scanning the container identifier (such as a barcode label) placed on the container. The central controller and/or a device 155 at the replenishment area 105 may verify that the operator 125 or the robotic tool has picked the right containers by matching the container identifier from the barcode label to the container identifier information stored in a database associated with the central controller and/or the device 155.

Further, the central controller and/or the device 155 may further marry and/or associate the container identifiers of the containers 145a and 145b to the SKU 115 for goods tracking purposes. For example, subsequent to replenishing the goods from a SKU to a container, the central controller and/or the device 155 may associate the container identifier with the SKU identifier so that the central controller and/or the device 155 can track, in real time, goods in the container.

After picking the containers 145a and 145b from the gravity flow rack 130 and replenishing the containers 145a and 145b with goods from the SKU 115, the operator 125 or a robotic tool may then place the replenished containers 145a and 145b on the gravity flow rack 130 for transferring the filled or partially filled containers 145a and 145b to the second replenishment zone 140, as will be described with reference to FIG. 3. In an embodiment, partially filled containers 145 may be retained on the gravity flow rack 130 for further indication of association to a next SKU 115. In this regard, the central controller may determine a related SKU to the SKU 115 which was destocked into the container 110 by matching one or more characteristics of the SKUs, such as, but not limited to, type of goods, batch of goods, and the like. The central controller may then assign the container identifier of the partially filled container 110 to the one or more related SKUs based on the second predefined threshold value of the container. Thus, the storage capacity of the container 110 may be fully utilized.

The gravity flow rack 130, in accordance with the present disclosure, includes a multilevel staging area 205 for containers 110. The multilevel staging area 205 includes a plurality of conveying sections 210. In an embodiment, each conveying section 210 may have strip belts 215 for conveying containers 110 between the first replenishment zone 135 and the second replenishment zone 140. In another embodiment, the conveying sections 210 may be inclined towards the second replenishment zone 140, such that replenished containers 145a and 145b may be pushed on the conveying sections 210 by the operator 125 or a robotic tool, and the containers 145a and 145b may be conveyed to the second replenishment zone 140 because of gravity. In an embodiment, the conveying sections 210 may have a combination of the strip belts 215 and the incline. The gravity flow rack 130 may further include a central gravity conveyor section 220, as shown in FIG. 2. The central gravity conveyor section 220 may be inclined towards the first replenishment zone 135, such that empty containers 110 may be transferred from the second replenishment zone 140 to the first replenishment zone 135 on the central gravity conveyor section 220, as will be described with reference to FIG. 3.

Figure 3:
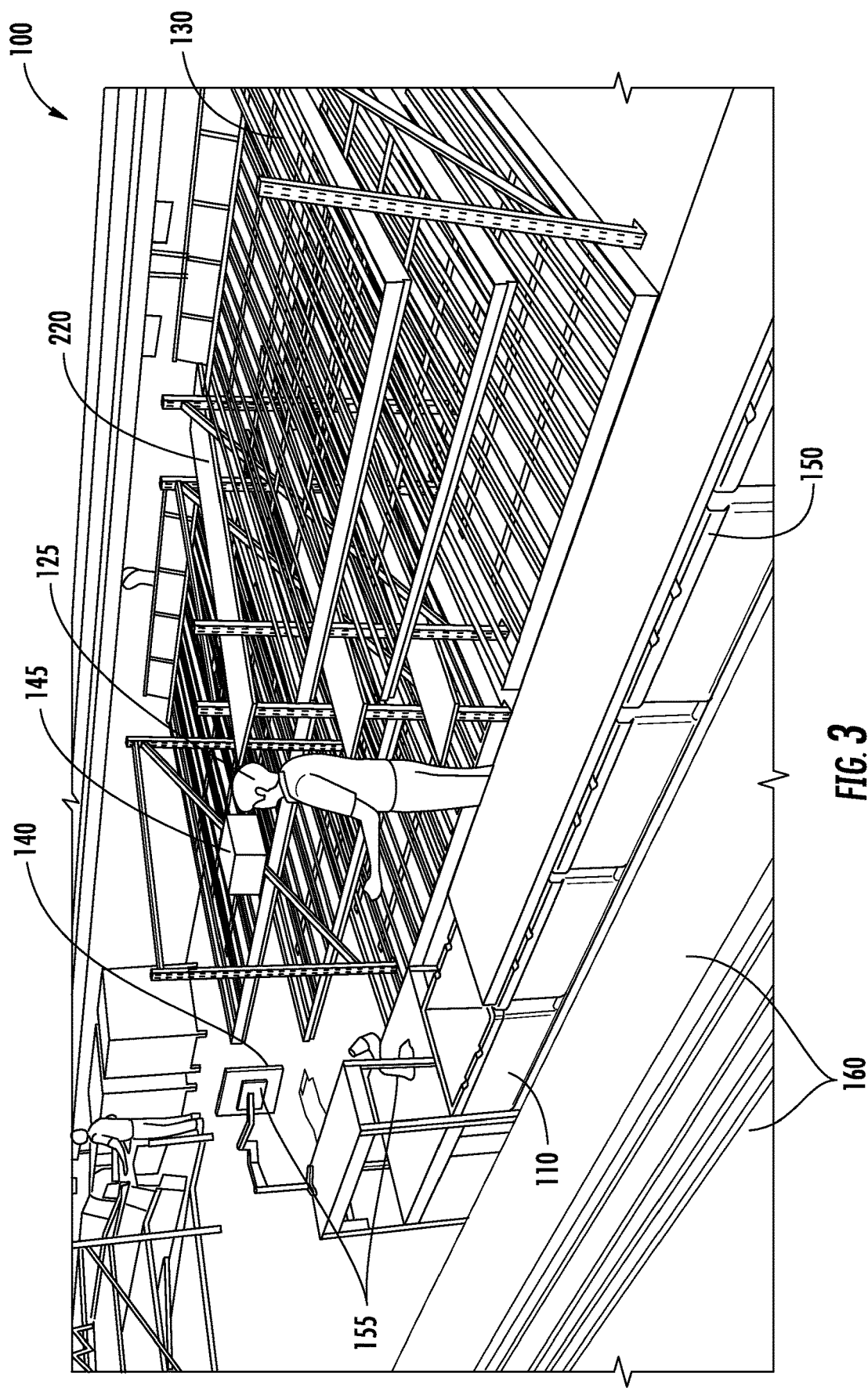
FIG. 3 illustrates a perspective view of a second replenishment zone of the distribution center in accordance with an embodiment of the present disclosure.

FIG. 3 illustrates a perspective view of the second replenishment zone 140 of the distribution center (DC) 100, in accordance with one or more embodiments of the present disclosure. The replenishment process in the second replenishment zone 140 includes replenishing one or more containers from the second set of containers 150 with goods from the replenished first set of containers 145 arriving at the second replenishment zone 140 through the gravity flow rack 130. In accordance with the present disclosure, the central controller may further generate a second ordered sequence of container identifiers indicative of an ordered sequence of the second set of containers 150 to be replenished with the goods from the first set of containers 145. In an embodiment, the second set of containers 150 may be shuttle totes having multiple compartments of different size. The shuttle totes may be partially filled or empty, and may be used to store goods in a storage facility, such as an ASRS system, in the DC 100. Various embodiments of the present invention maximize and optimize the storage capacity of shuttle totes so that a shuttle tote may be sent to the ASRS only when the shuttle tote is completely filled. This reduces the time and resources spent in transferring half-filled shuttle totes to the storage location and retrieving the half-filled shuttle totes for further replenishment.

The second set of data accessible to the central controller may further include container identifiers for the second set of containers 150. As described above, the container identifiers for the second set of containers 150 may include a third predefined threshold value for each of the second set of containers 150. The third predefined threshold value may be indicative of a capacity of each of the second set of containers 150. In an embodiment, the third predefined threshold value may indicate a maximum capacity of each of the second set of containers 150. In another embodiment, the third predefined threshold value may indicate a current capacity of each of the second set of containers 150. The central controller may correlate the third predefined threshold values of the second set of containers 150, for example, shuttle totes, to the second predefined threshold values of the one or more first set of containers 145 that are replenished and have arrived at the second replenishment zone 140. Based on the correlation, the central controller may generate a second ordered sequence of container identifiers for the second set of containers 150. In response, the second set of containers 150 may be queued according to the ordered sequence of container identifiers, as shown in FIG. 3. The operator 125 or a robotic tool may replenish one or more containers from the second set of containers 150 available for replenishment with goods from the first set of containers 145 based on the second ordered sequence of container identifiers. For example, the central controller may provide a visual and/or an audio indication to the operator 125 identifying container identifiers for one or more of the first set of containers 145 to be picked for replenishing the container from the second set of containers 150 available for replenishment. In an embodiment, the central controller may further indicate one or more compartments in the second set of containers 150 to be replenished with goods from the one or more of the first set of containers 145.

Further, as described above, the operator 125 may scan container identifiers associated with each of the first set of containers 145 picked by the operator 125 and a container identifier, such as a barcode label, associated with the container from the second set of containers 150 available for replenishment. The central controller and/or a device 155 at the replenishment area 105 may verify that the operator 125 has picked the right containers by matching the container identifiers from the barcode label to the container identifier stored in a database associated with the central controller and/or the device 155. Further, the central controller and/or the device 155 may further marry and/or associate the container identifiers of the one or more containers from the second set of containers 150 receiving goods from the SKU 115 via one or more first set of containers 145, for goods tracking purposes.

For example, the central controller may maintain a log of flow of goods from the SKU 115 to the one or more first set of containers 145. When the goods are transferred from the one or more first set of containers 145 to one or more second set of containers 150, the log may be updated to associate the SKU 115 identifier with the container identifier(s) of the one or more second set of containers 150. After the goods are transferred, the one or more first set of containers 145 may be disassociated from the SKU 115 by the central controller and may be available to be associated with a next SKU by the central controller. Thus, the goods are tracked within the DC 100 throughout the replenishment process.

In some embodiments, the operator 125 or a robotic tool may scan the container identifier corresponding to one of the second set of containers (i.e. shuttle totes) and the container identifier(s) corresponding to one or more first set of containers based on the second ordered sequence of container identifiers. This enables the central controller to determine any error condition that may have occurred, such as, for example, the shuttle tote is not empty, the shuttle tote size does not fit the goods to be replenished, etc. The error condition can be dynamic and configurable, and may change and adapt as needs require.

As mentioned above, after replenishment, the operator 125 may place the empty containers from the first set of containers 145 on the central gravity conveyor section 220. The central gravity conveyor section 220 may be inclined towards the first replenishment zone 135, such that empty containers 110 may be transferred from the second replenishment zone 140 to the first replenishment zone 135 to receive goods from a next SKU 115. Further, when a container 110 from the second set of containers 150 is replenished with goods from the one or more first set of containers 145, the operator 125 or a robotic tool may push the container 110 onto the take away conveyor 160, as shown in FIG. 3. The take away conveyor 160 may convey the container 110 to a storage location and/or to downstream material handling systems for further processing and/or handling.

Thus, the replenishment process is automated and optimized by automatically identifying appropriate containers from a wide variety of containers available for replenishment, and presenting the containers in an ordered sequence to an operator or a robotic tool for replenishment.

Figure 4:
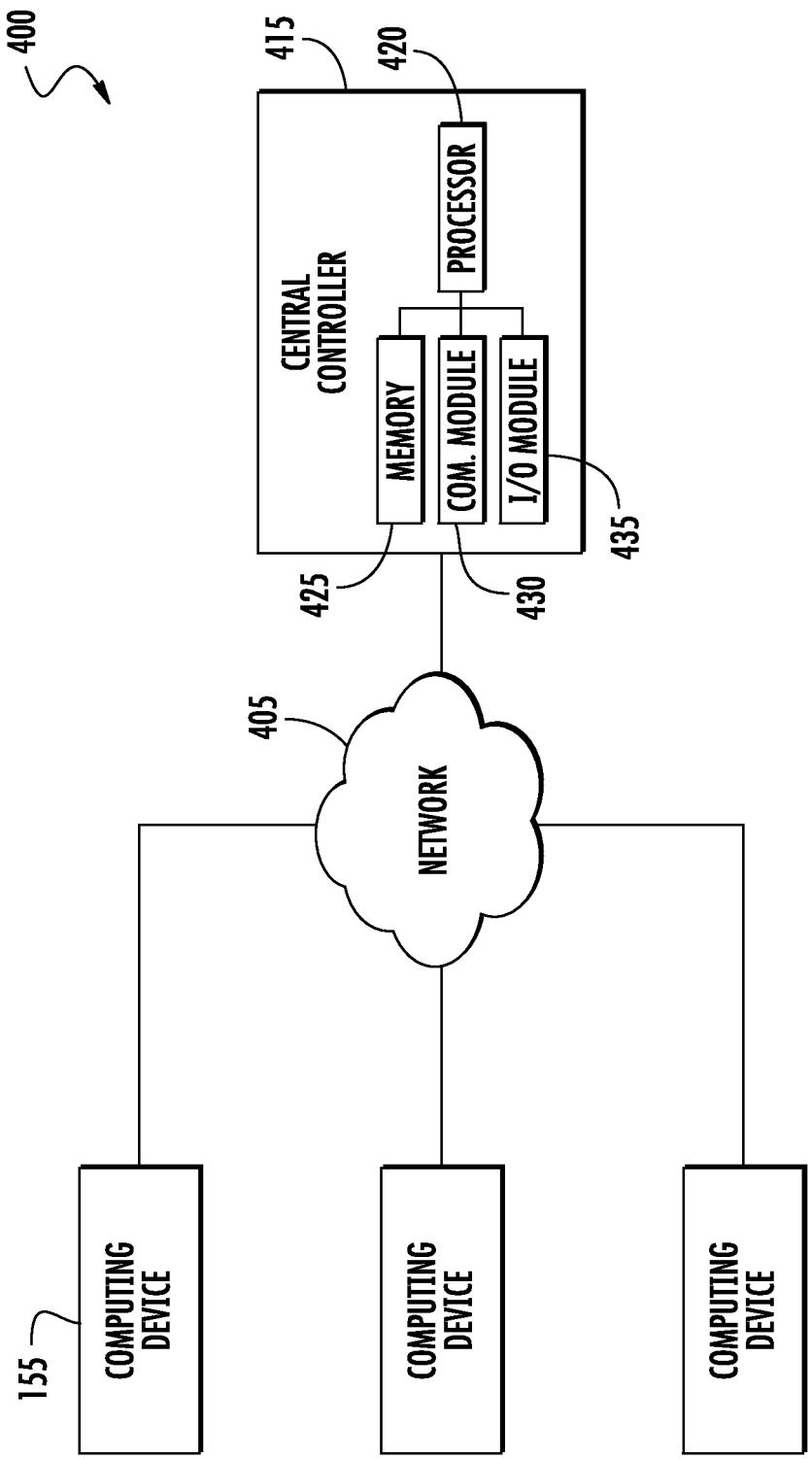
FIG. 4 illustrates a schematic block diagram of a distribution center management system in accordance with one or more embodiments of the present disclosure.

FIG. 4 illustrates a schematic block diagram of a distribution center management system 400, in accordance with one or more embodiments of the present disclosure. The distribution center management system 400 may include a plurality of devices 155 communicably coupled to a central controller 415 through a network 405. In this regard, network 405 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 405 may include a cellular telephone, an 802.11, 802.16, 802.20, and/or WiMax network. In some embodiments, Bluetooth may be used to communicate between devices. Further, the network 405 may include a public network, such as the Internet, a private network, such as an intranet, or combinations thereof, and may utilize a variety of networking protocols now available or later developed including, but not limited to TCP/IP based networking protocols. Devices 155 may each be implemented as a device, such as a personal computer and/or other networked device, such as an indicia scanner, an imager, a cellular phone, tablet computer, mobile device, point of sale terminal, inventory management terminal etc., that may be used for any suitable purpose in addition to communicating with the central controller 415 for providing data related to the SKUs 115 arriving at the replenishment area 105 and receiving commands and/or data from the central controller 415.

Further, the central controller 415 may include at least one processor 420, memory 425, communications module 430, and input/output module 435, as shown in FIG. 4. The processor 420 may be configured with processor executable instructions to perform operations described herein. Processor 420 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments processor 420 comprises a plurality of processors. The plurality of processors may be embodied on a single device or may be distributed across a plurality of devices. The plurality of processors may be in operative communication with each other and may be collectively configured to perform one or more functionalities of the central controller 415 as described herein. In an example embodiment, processor 420 is configured to execute instructions stored in memory 425 or otherwise accessible to processor 420. These instructions, when executed by processor 420, may cause central controller 415 to perform one or more of the functionalities of central controller 415, as described herein.

Memory 425 may comprise, for example, volatile memory, non-volatile memory, or some combination thereof. Although illustrated in FIG. 4 as a single memory, memory 425 may comprise a plurality of memory components. The plurality of memory components may be embodied on a single device or distributed across a plurality of devices. In various embodiments, memory 425 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 425 may be configured to store information, data (including item data and/or profile data), applications, instructions, or the like for enabling central controller 415 to carry out various functions in accordance with example embodiments of the present invention. For example, in at least some embodiments, memory 425 is configured to buffer input data for processing by processor 420. Additionally or alternatively, in at least some embodiments, memory 425 is configured to store program instructions for execution by processor 420. Memory 425 may store information in the form of static and/or dynamic information. This stored information may be stored and/or used by the central controller 415 during the course of performing its functionalities.

Communications module 430 may be embodied as any device or means embodied in circuitry, hardware, a computer program product comprising computer readable program instructions stored on a computer readable medium (e.g., memory 425) and executed by a processing device (e.g., processor 420), or a combination thereof that is configured to receive and/or transmit data from/to another device and/or network, such as, for example, the device 155. In some embodiments, communications module 430 (similar to other components discussed herein) can be at least partially embodied as or otherwise controlled by processor 420. In this regard, communications module 430 may be in communication with processor 420, such as via a bus. Communications module 430 may include, for example, an antenna, a transmitter, a receiver, a transceiver, network interface card and/or supporting hardware and/or firmware/software for enabling communications with another device. Communications module 430 may be configured to receive and/or transmit any data that may be stored by memory 425 using any protocol for communications between devices. Communications module 430 may additionally or alternatively be in communication with the memory 425, input/output module 435 and/or any other component of the central controller 415, such as via a bus.

Input/output module 435 may be in communication with processor 420 to receive an indication of a user input and/or to provide an audible, visual, mechanical, or other output to a user. As such, input/output module 435 may include support, for example, for a keyboard, a mouse, a joystick, a display, a touch screen display, a microphone, a speaker, a RFID reader, barcode reader, biometric scanner, and/or other input/output mechanisms. In embodiments wherein the central controller 415 is embodied as a server or database, aspects of input/output module 435 may be reduced as compared to embodiments where the central controller 415 is implemented as an end-user machine (e.g., remote worker device and/or employee device) or other type of device designed for complex user interactions. In some embodiments (like other components discussed herein), input/output module 435 may even be eliminated from the central controller 415. Alternatively, such as in embodiments wherein the central controller 415 is embodied as a server or database, at least some aspects of input/output module 435 may be embodied on an apparatus used by a user that is in communication with the central controller 415. Input/output module 435 may be in communication with the memory 425, communications module 430, and/or any other component(s), such as via a bus. One or more than one input/output module and/or other component can be included in the central controller 415.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 420, as discussed above with reference to FIG. 4, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 425) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Figure 5:
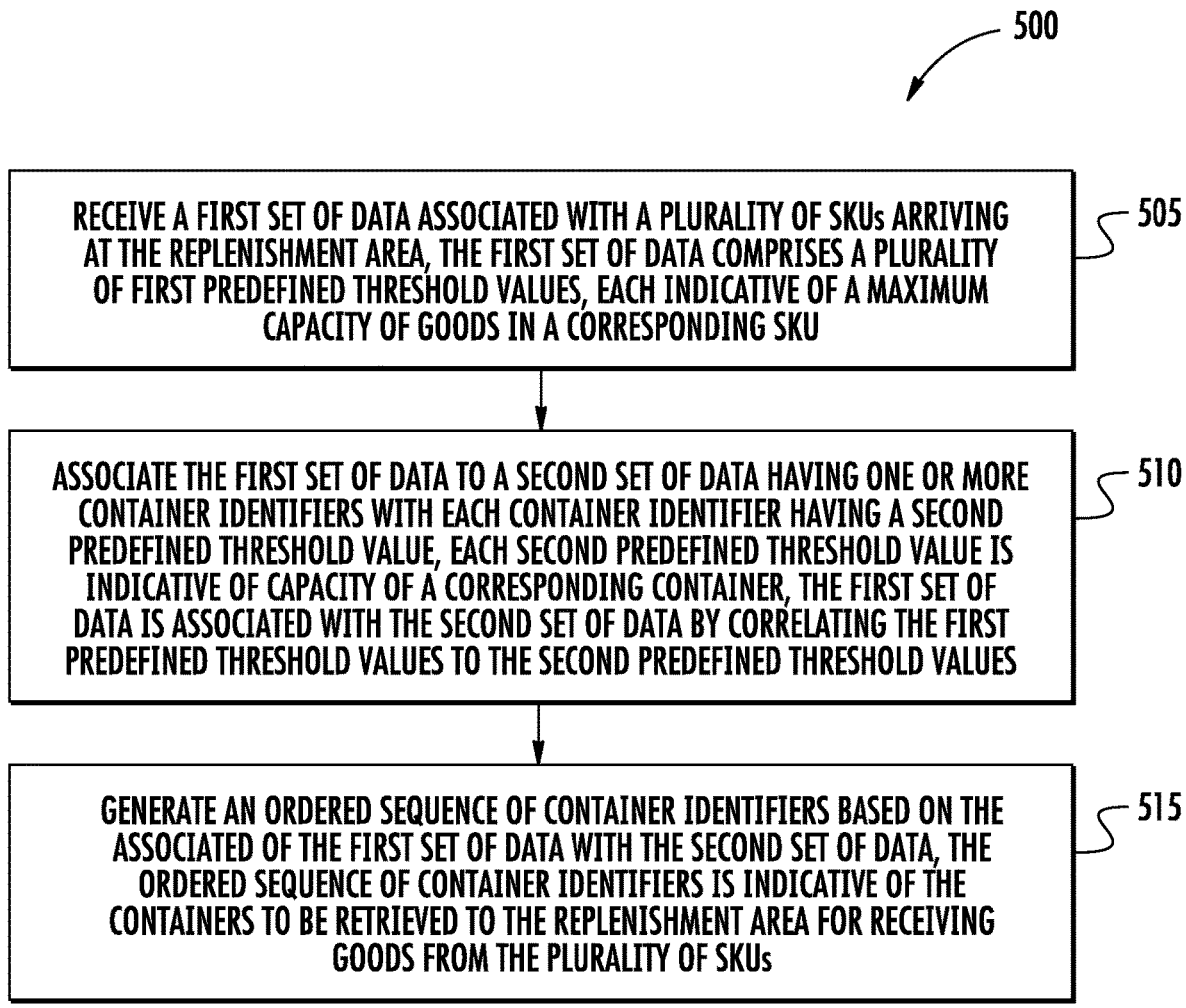
FIG. 5 illustrates an example method for replenishing containers with goods from stock keeping units (SKUs), in accordance with one or more embodiments of the present disclosure.

FIG. 5 illustrates an example method 500 for replenishing containers 110 with goods from stock keeping units (SKUs) 115, in accordance with one or more embodiments of the present disclosure. The method 500 may include receiving, by the central controller 415 and/or any other associated device, a first set of data associated with a plurality of SKUs 115 arriving at the replenishment area 105, at block 505. The first set of data may include a plurality of first predefined threshold values, each indicative of a maximum capacity of goods in a corresponding SKU 115. As described above, in an embodiment, the first set of data may be obtained by scanning and/or reading, by a device 155, SKU identifiers associated with each of the plurality of SKUs 115. SKU identifier may refer to a unique identifier that may be used to identify a particular SKU 115, such as, but not limited to, a barcode label, RFID tag, etc. The device 155 may be communicably coupled to the central controller 415, and may transmit the first set of data to the central controller 415. Based on the received first set of data, the central controller 415 may determine first predefined threshold values for each of the plurality of SKUs 115. The first predefined threshold values may indicate a maximum capacity of goods contained in each SKU 115. For example, the first predefined threshold value may indicate a cubic measure of the goods contained in the SKU 115.

The method 500 may further include associating the first set of data to a second set of data having one or more container identifiers with each container identifier having a second predefined threshold value, at block 510. As described above, each container 110 may have an associated container identifier. The container identifier may refer to a unique identifier that may be used to identify a particular container 110, such as, but not limited to, a serial number, a barcode label, RFID tag, etc. The container identifier may include information regarding the container 110, such as, but not limited to, type, size, capacity, weight, shape, and the like. In an embodiment of the present disclosure, each container identifier may include a second predefined threshold value for a corresponding container 110. Further, each second predefined threshold value may be indicative of a capacity of a corresponding container 110. For example, the second predefined threshold value may indicate a current and/or a maximum capacity of the container 110. In an embodiment, the central controller 415 may receive the second set of data from the memory 425 and/or from a remote database accessible to the central controller 415. The central controller 415 may associate the first set of data to the second set of data by correlating the first predefined threshold values to the second predefined threshold values. For example, the central controller 415 may determine that the first predefined threshold value indicative of a maximum capacity of goods associated with an SKU 115 is X cubic unit. The central controller 415 may access a database of second set of data to match and/or correlate the first predefined threshold value of X cubic unit to one or more second predefined threshold values associated with one or more container identifiers in the second set of data. For example, the central controller 415 may search for a container identifier having second predefined threshold value equal to or slightly more than X cubic unit. In an embodiment, if there are no container identifier having second predefined threshold value equal to or slightly more than the first predefined threshold value, the central controller 415 may correlate the first predefined threshold value to multiple container identifiers such that the sum of the second predefined threshold values of the one or more containers is more than or equal to the first predefined threshold value.

The method 500 may further include generating an ordered sequence of container identifiers based on the association of the first set of data with the second set of data, at block 515. For example, in accordance with the present disclosure, the ordered sequence of container identifiers may be indicative of the containers to be retrieved to the replenishment area 105 for receiving goods from the plurality of SKUs 115. Based on the association described above, the central controller 415 may identify one or more containers corresponding to the one or more container identifiers associated with the first predefined threshold value by the central controller 415. For example, the central controller 415 may determine that two containers having x and y cubic unit capacity should be replenished with the goods from the SKU 115 having a=x+y cubic unit of goods. Based on the determination, the central controller 415 may generate an ordered sequence of container identifiers indicative of the containers to be retrieved to the replenishment area 105 for receiving goods from the SKU 115. For example, the central controller may generate an ordered sequence indicating a container with x cubic unit capacity followed by a container with y cubic unit capacity should be used to replenish goods from an SKU 115 having a=x+y cubic unit of goods.

In some embodiments, the central controller 415 may transmit the ordered sequence of container identifiers to the replenishment area 105, for example, by displaying the ordered sequence on a display of device 155. The operator 125 may follow the ordered sequence displayed on the display of device 155 and may pick the identified containers 110 for replenishing with goods from an SKU 115. In some embodiments, the central controller 415 may transmit the ordered sequence of container identifiers to a container presenting means, such as a goods-to-operator workstation, for presenting the identified containers 110 to the operator 125 and/or a robotic tool in the ordered sequence. Thus, the operator 125 and/or a robotic tool may replenish identified containers with goods from one or more SKUs 115 arriving at the replenishment area 105.

In some embodiments, the central controller 415 may determine one or more related SKUs from the plurality of SKUs based on matching at least one characteristic of the plurality of SKUs. For example, the central controller 415 may determine that two SKUs have the same size. Based on the matching of at least one characteristic, the central controller 415 may assign the same container identifier to the one or more related SKUs to indicate that they have the same second predefined threshold value.

Figure 6:
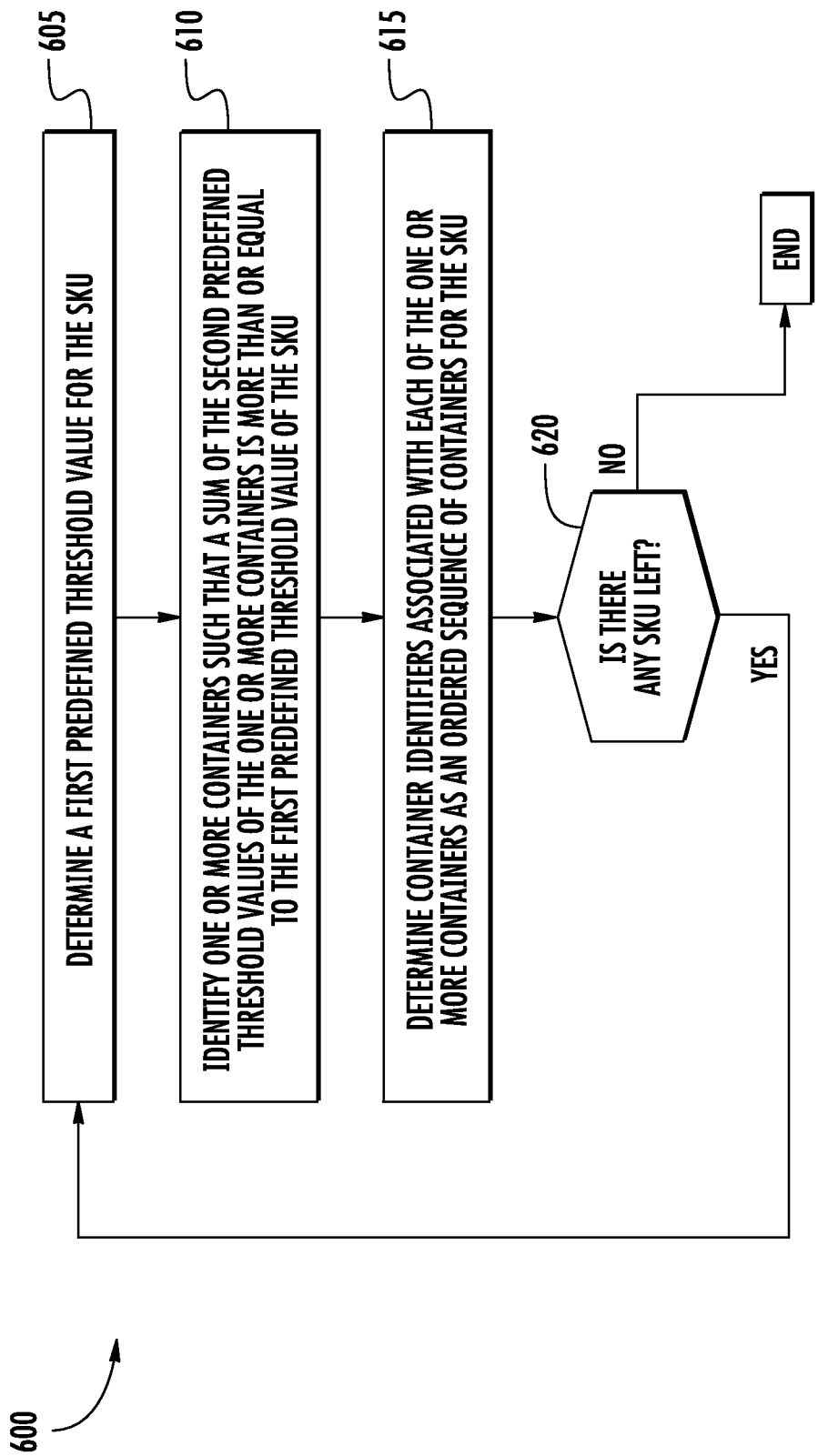
FIG. 6 illustrates an example method for replenishing containers with goods from stock keeping units (SKUs), in accordance with one or more embodiments of the present disclosure.

FIG. 6 illustrates an example method 600 for replenishing containers 110 with goods from stock keeping units (SKUs) 115, in accordance with one or more embodiments of the present disclosure. The method 600 relates to generating an ordered sequence of container identifiers for a plurality of SKUs 115 arriving at the replenishment area 105. The method 600 includes determining a first predefined threshold value for an SKU 115, at block 605. As described above, the central controller 415 and/or any other associated device may receive a first set of data having a first predefined threshold value for the SKU 115, for example, from a device 155 reading and/or scanning a SKU identifier associated with the SKU 115 at the replenishment area 105. The first predefined threshold value may be indicative of a maximum capacity of goods in the corresponding SKU 115. Further, the method 600 includes identifying one or more containers 110 such that a sum of the second predefined threshold values of the one or more containers 110 is more than or equal to the first predefined threshold value of the SKU 115, at block 610. As described above, each container 110 may have an associated container identifier. The container identifier may refer to a unique identifier that may be used to identify a particular container 110, such as, but not limited to, a serial number, a barcode label, RFID tag, etc. Each container identifier may include a second predefined threshold value for a corresponding container 110. Further, each second predefined threshold value may be indicative of a capacity of a corresponding container 110. For example, the second predefined threshold value may indicate a current and/or a maximum capacity of the container 110. Thus, the central controller 415 may identify one or more containers 110 such that a sum of the second predefined threshold values of the one or more containers 110 is more than or equal to the first predefined threshold value of the SKU 115. The method 600 further includes determining container identifiers associated with each of the one or more containers 110 as an ordered sequence of containers for the SKU 115, at block 615. For example, the central controller 415 may generate an ordered sequence of container identifiers having a segment indicating Container A, followed by Container B, followed by Container C for the SKU 115.

At block 620, the method 600 determines whether there are any SKUs 115 that has not been handled. If so, the method 600 proceeds to block 605 and repeats the above steps for each SKU 115. Thus, the overall ordered sequence of container identifiers for a plurality of SKUs 115 may be a combination of determined ordered sequence corresponding to each SKU 115. For example, the overall ordered sequence for the plurality of SKUs 115 may include Container A, followed by Container B, followed by Container C, followed by Container X, . . . , followed by Container Z. Further, if there are no more SKUs 115 for handling at block 620, the method 600 proceeds to block 625 and ends.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A method for replenishing containers with goods from stock keeping units (SKUs) arriving at a replenishment area in a distribution center, comprising:

receiving, by a central controller, a first set of data associated with a plurality of SKUs arriving at the replenishment area, wherein the first set of data comprises a plurality of first predefined threshold values, each indicative of a maximum capacity of goods in a corresponding SKU;

associating, by the central controller, the first set of data to a second set of data, wherein the second set of data comprises one or more container identifiers with each container identifier having a second predefined threshold value, wherein each second predefined threshold value is indicative of a capacity of a corresponding container, wherein the first set of data is associated with the second set of data by correlating the first predefined threshold values to the second predefined threshold values; and generating, by the central controller, an ordered sequence of container identifiers based on the association of the first set of data with the second set of data, wherein the ordered sequence of container identifiers is indicative of the containers to be retrieved to the replenishment area for receiving goods from the plurality of SKUs.

2. The method of claim 1, wherein the first set of data is determined by the central controller based on a pallet identifier of a pallet having the plurality of SKUs.

3. The method of claim 1, wherein the first set of data is determined by the central controller based on one or more SKU identifiers associated with each of the plurality of SKUs.

4. The method of claim 1, wherein generating the ordered sequence of container identifiers comprises:
(1) determining, by the central controller, a first predefined threshold value for a first SKU;
(2) identifying, by the central controller, one or more containers such that a sum of second predefined threshold values of the one or more containers is more than or equal to the first predefined threshold value of the first SKU;
(3) determining, by the central controller, container identifiers associated with each of the one or more containers as a segment of the ordered sequence of container identifiers; and
(4) repeating steps (1)-(3) for each of the plurality of SKUs to determine the ordered sequence of container identifiers for the plurality of SKUs.

5. The method of claim 1, wherein generating the ordered sequence of container identifiers further comprises:
generating a first ordered sequence of container identifiers, wherein the first ordered sequence of the container identifiers is indicative of a first set of containers to be retrieved to a first replenishment zone of the replenishment area for receiving goods from the plurality of SKUs; and
generating a second ordered sequence of container identifiers, wherein the second ordered sequence of container identifiers is indicative of a second set of containers to be retrieved to a second replenishment zone of the replenishment area for receiving goods from the first set of containers.

6. The method of claim 1, wherein the second predefined threshold value is indicative of a maximum capacity of a corresponding container.

7. The method of claim 1, wherein the second predefined threshold value is indicative of a current capacity of a corresponding container.

8. The method of claim 1, further comprising:
determining, by the central controller, one or more related SKUs from the plurality of SKUs based on matching at least one characteristic of the plurality of SKUs; and
assigning, by the central controller, a same container identifier to the one or more related SKUs based on the second predefined threshold value.

9. A method for replenishing containers with goods from stock keeping units (SKUs) arriving at a replenishment area in a distribution center, comprising:
transmitting, to a central controller, a first set of data associated with a plurality of SKUs arriving at the replenishment area, wherein the first set of data comprises a plurality of first predefined threshold values, each indicative of a maximum capacity of goods in a corresponding SKU;
receiving, from the central controller, an ordered sequence of container identifiers indicative of the containers to be retrieved to the replenishment area for receiving goods from the plurality of SKUs based on an association of the first set of data with a second set of data, wherein the second set of data comprises one or more container identifiers with each container identifier having a second predefined threshold value indicative of a capacity of a corresponding container, wherein the first set of data is associated with the second set of data by correlating the first predefined threshold values to the second predefined threshold values;
retrieving the containers to the replenishment area based on the ordered sequence of container identifiers; and
replenishing goods from each of the plurality of SKUs into the containers.

10. The method of claim 9, further comprising scanning a pallet identifier of a pallet having the plurality of SKUs to transmit the first set of data associated with the plurality of SKUs.

11. The method of claim 9, further comprising scanning one or more SKU identifiers associated with each of the plurality of SKUs to transmit the first set of data associated with the plurality of SKUs.

12. The method of claim 9, wherein receiving the ordered sequence of container identifiers further comprises:
receiving a first ordered sequence of container identifiers, wherein the first ordered sequence of the container identifiers is indicative of a first set of containers to be retrieved to a first replenishment zone of the replenishment area for receiving goods from the plurality of SKUs; and
receiving a second ordered sequence of container identifiers, wherein the second ordered sequence of container identifiers is indicative of a second set of containers to be retrieved to a second replenishment zone of the replenishment area for receiving goods from the first set of containers.

13. The method of claim 9, wherein the second predefined threshold value is indicative of a maximum capacity of a corresponding container.

14. The method of claim 9, wherein the second predefined threshold value is indicative of a current capacity of a corresponding container.

15. The method of claim 9, wherein replenishing goods from an SKU into one or more containers further comprises:
scanning an SKU identifier associated with one of the plurality of SKUs; and
scanning one or more container identifiers associated with the containers to associate the containers with the goods from the SKUs.

16. A system for replenishing containers with goods from stock keeping units (SKUs) arriving at a replenishment area in a distribution center, comprising:
a central controller; and
one or more devices communicably coupled to the central controller, wherein the one or more devices are configured to transmit a first set of data associated with a plurality of SKUs arriving at the replenishment area to the central controller, wherein the first set of data comprises a plurality of first predefined threshold values, each indicative of a maximum capacity of goods in a corresponding SKU,
wherein the central controller is configured to:
associate the first set of data to a second set of data, wherein the second set of data comprises one or more container identifiers with each container identifier having a second predefined threshold value, wherein each second predefined threshold value is indicative of a capacity of a corresponding container, wherein the first set of data is associated with the second set of data by correlating the first predefined threshold values to the second predefined threshold values; and
generate an ordered sequence of container identifiers based on the association of the first set of data with the second set of data, wherein the ordered sequence of container identifiers is indicative of the containers to be retrieved to the replenishment area for receiving goods from the plurality of SKUs.

17. The system of claim 16, wherein one or more containers are retrieved to the replenishment area based on the ordered sequence of container identifiers.

18. The system of claim 16, further comprising a gravity flow rack connecting a first replenishment zone to a second replenishment zone of the replenishment area for transferring containers between the first replenishment zone and the second replenishment zone, wherein the central controller is configured to:
  generate a first ordered sequence of container identifiers, wherein the first ordered sequence of the container identifiers is indicative of a first set of containers to be retrieved to the first replenishment zone of the replenishment area for receiving goods from the plurality of SKUs; and
  generate a second ordered sequence of container identifiers, wherein the second ordered sequence of container identifiers is indicative of a second set of containers to be retrieved to the second replenishment zone of the replenishment area for receiving goods from the first set of containers.

19. The system of claim 18, wherein the central controller is further configured to:
  cause replenishment of the first set of containers; and
  cause transferring the first set of containers to the second replenishment zone through the gravity flow rack.

20. The system of claim 18, wherein the central controller is further configured to:
  cause replenishment of the first set of containers; and
  cause transferring the second set of containers to a storage location in the distribution center.

* * * * *